United States Patent
Li et al.

(10) Patent No.: US 8,089,172 B2
(45) Date of Patent: *Jan. 3, 2012

(54) METHOD FOR DETERMINING A ROTOR POSITION OF AN ELECTRICAL GENERATOR IN A WIND TURBINE

(75) Inventors: Bing Li, Singapore (SG); Shu Yu Cao, Singapore (SG); Gert Karmisholt Andersen, Hovedgard (DK); Anshuman Tripathi, Singapore (SG); Eng Kian Kenneth Sng, Singapore (SG); Amit Kumar Gupta, Singapore (SG)

(73) Assignee: Vestas Wind Systems A/S, Randers SV (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/008,202

(22) Filed: Jan. 18, 2011

(65) Prior Publication Data

US 2011/0109279 A1 May 12, 2011

Related U.S. Application Data

(63) Continuation of application No. 12/817,653, filed on Jun. 17, 2010.

(60) Provisional application No. 61/218,442, filed on Jun. 19, 2009.

(30) Foreign Application Priority Data

Jun. 19, 2009 (DK) ................................. 2009 00754

(51) Int. Cl.
*F03D 9/00* (2006.01)
*H02P 9/04* (2006.01)

(52) U.S. Cl. ......................................... 290/44; 322/44
(58) Field of Classification Search ................... 290/44, 290/55; 322/44, 24, 28; 415/1; 700/287; 416/1

See application file for complete search history.

(56) References Cited

U.S. PATENT DOCUMENTS

| | | | |
|---|---|---|---|
| 3,051,880 A * | 8/1962 | Livingston | 318/608 |
| 3,510,672 A * | 5/1970 | Poppinger et al. | 307/53 |
| 6,674,261 B2 * | 1/2004 | Takahashi et al. | 318/721 |

(Continued)

FOREIGN PATENT DOCUMENTS

JP 2002354876 A 12/2002

OTHER PUBLICATIONS

European Patent Office, Search Report issued in related European Application Serial No. 10166359.9 dated Nov. 30, 2010.

(Continued)

*Primary Examiner* — Julio Cesar Gonzalez
(74) *Attorney, Agent, or Firm* — Wood, Herron & Evans, LLP

(57) ABSTRACT

A method for determining a rotor position of an electrical generator in a wind turbine is described comprising determining a voltage of the electrical generator, determining a rotor position angle estimate based on the voltage of the electrical generator, determining a subsequent rotor position angle estimate through a feedback loop, based on a combination of the voltage of the electrical generator and the rotor position angle estimate. Further, a method to real time track encoder health is described comprising determining the phase angle of a reference voltage, determining the angle difference between the rotor position and the reference voltage, and determining the differentiation of the angle difference.

13 Claims, 9 Drawing Sheets

U.S. PATENT DOCUMENTS

| | | | |
|---|---|---|---|
| 7,002,318 | B1 | 2/2006 | Schulz et al. |
| 7,332,894 | B2 * | 2/2008 | Ichinose et al. ................. 322/29 |
| 2004/0046519 | A1 | 3/2004 | Leonardi et al. |
| 2004/0052217 | A1 | 3/2004 | Anghel et al. |
| 2005/0033547 | A1 * | 2/2005 | Morishita .................... 702/147 |
| 2005/0140324 | A1 | 6/2005 | Kunzel et al. |
| 2006/0052972 | A1 * | 3/2006 | Hu et al. ...................... 702/147 |
| 2009/0200980 | A1 * | 8/2009 | Ramu et al. ................... 318/701 |
| 2010/0194320 | A1 * | 8/2010 | Kaneko .................... 318/400.23 |
| 2010/0327585 | A1 * | 12/2010 | Cao et al. ........................ 290/44 |

OTHER PUBLICATIONS

USPTO, Notice of Allowance issued in related U.S. Appl. No. 12/817,653 dated Nov. 21, 2011.

* cited by examiner

METHOD FOR DETERMINING A ROTOR POSITION OF AN ELECTRICAL GENERATOR IN A WIND TURBINE

CROSS-REFERENCE TO RELATED APPLICATIONS

This application is a continuation of application Ser. No. 12/817,653, filed Jun. 17, 2010, which claims the benefit of U.S. Provisional Application No. 61/218,442, filed Jun. 19, 2009, and claims priority under 35 U.S.C. §119 to Danish Patent Application No. PA 2009-00754, filed Jun. 19, 2009. The content of each of these applications is hereby incorporated by reference herein in its entirety for all purposes.

TECHNICAL FIELD

The present invention relates generally to a method for determining a rotor position of a synchronous electrical generator in a wind turbine.

BACKGROUND

In recent years, it has become very common to use wind for the generation of electrical power. In order to do this, wind is captured by a set of blades of a wind power plant. The captured wind causes a shaft connected to the set of blades to rotate. The shaft is typically connected to a rotor of an electrical generator which is rotated in accordance with the rotation of the shaft, possibly at a multiple of the rotation speed of the shaft in case the rotor is connected to the shaft via a gearbox. The electrical generator converts the mechanical power provided by the wind in form of the rotation into electrical power which may be supplied to a power grid.

For various functions of a wind turbine generator, a determination of the rotation speed and/or the position of the rotor of the electrical generator is required, such as for stator flux control which allows controlling the magnitude of the electromagnetic power provided by the electrical generator.

The determination of the rotation speed and the position of the rotor of the electrical generator is typically carried out by a so-called encoder which may have an offset, e.g., determines the angular position of the rotor with a certain offset. Therefore, before any function for which a determination of the rotation speed and/or the position of the rotor is required can be started, which typically includes the start of actual power supply of the electrical generator to a power grid, offset encoder calibration has to be carried out, i.e. the encoder offset has to be determined by which the phase angle of the rotor output by the encoder is adjusted such that the adjusted phase angle is aligned with the actual phase angle of the rotor (e.g., a permanent magnet rotor).

A known method for encoder offset calibration from a single stator line voltage is based on zero crossing detection of the line voltages output by the electrical generator (i.e. a stator line voltage of the electrical generator). At each cycle when the line voltage is found to have changed from a negative value to a positive value, a zero crossing point is detected. At this time instant, the corresponding output by the encoder is captured and the offset is calculated. Similarly, a rotor flux may be computed based on peak value detection of a line voltage signal.

Since the zero crossing detection is prone to the noise, the accurate detection of the zero crossings for encoder offset calibration may be very difficult to achieve, even after some measures are used to improve it like linear interpolation, averaging etc.

Another issue is the calibration time. Since only one zero crossing point in one cycle (of the line voltage) is used for calibration, the processing time is long.

Hence, an objective of the present invention may be seen in providing a method for determining a rotor position of an electrical generator which may be used for encoder offset calibration and which is more accurate and requires less processing time.

Since the encoder is prone to failure in a WTG (wind turbine generator), a real time tracking of encoder health is required for reliable operation. It should be able to track encoder health real time in normal operation, and send the alarm in case of encoder failure and malfunction. An object of the present invention may also be seen in providing a method for this real time health tracking.

SUMMARY

According to one embodiment, a method for determining a rotor position of an electrical generator in a wind turbine is provided, comprising determining a voltage of the electrical generator; determining a rotor position angle estimate based on the voltage of the electrical generator; and determining a subsequent rotor position angle estimate through a feedback loop, based on a combination of the voltage of the electrical generator and the rotor position angle estimate.

According to one embodiment, the combination includes a coordinate transformation of the voltage into a rotational frame using the rotor position angle estimate.

According to one embodiment, the combination includes the determination of the difference between the phase of the voltage and an expected phase of the voltage, wherein the expected phase of the voltage is a phase that is to be expected when the rotor of the electrical generator has the rotor position according to the rotor position angle estimate.

According to one embodiment, the rotor position angle estimate is determined based on the phase of the voltage of the electrical generator.

According to one embodiment, a voltage of the electrical generator at a first time instant and a voltage of the electrical generator at a second time instant are generated, wherein the rotor position angle estimate is determined based on the voltage of the electrical generator at the first time instant, wherein the rotor position angle estimate is combined with the voltage of the electrical generator at the second time instant; and wherein the subsequent rotor position angle estimate is determined based on the combination.

According to one embodiment, the subsequent rotor position angle estimate is determined using a control loop.

According to one embodiment, the subsequent rotor position angle estimate is determined using a phase locked loop.

According to one embodiment, the subsequent rotor position angle estimate is determined using a PI controller.

According to one embodiment, the combination includes the determination of the difference between the phase of the voltage and an expected phase of the voltage, wherein the expected phase of the voltage is a phase that is to be expected when the rotor of the electrical generator has the rotor position according to the rotor position angle estimate, and the difference is used as input for the PI controller.

According to one embodiment, the PI controller is used to determine an angular speed of the voltage.

According to one embodiment, an integrator is used to integrate the angular speed of the voltage for rotor position estimation.

According to one embodiment, the subsequent rotor position estimate is determined based on an adjustable gain function which adjusts the rotor position estimation speed.

According to one embodiment, the voltage is a stator voltage of the electrical generator.

According to one embodiment, the voltage is determined from a line-to-line voltage (phase-to-phase voltage) of the electrical generator.

According to one embodiment, the phase voltages of the electrical generator are determined from the line-to-line voltage and the voltage is determined from the phase voltages.

According to one embodiment, the method is being carried out in a power generation system.

According to one embodiment, the power generation system comprises an encoder for a rotor position determination of the electrical generator and the method further comprises determining an offset of the encoder based on the subsequent rotor position angle estimate.

According to one embodiment, the encoder is calibrated based on the offset.

According to one embodiment, the power generation system comprises an encoder for a rotor position determination of the electrical generator and the method further comprises detecting whether a malfunction of the encoder has occurred based on the subsequent rotor position angle estimate.

According to one embodiment, the power generation system comprises an encoder for a rotor position determination of the electrical generator, and the method further comprises the determination of a rotor flux amplitude of the electrical generator based on the voltage and an output of the encoder.

According to another embodiment, the encoder output is an angular speed measurement of the electrical generator.

According to an embodiment, the subsequent rotor position estimate is used in the control of the electrical generator.

According to another embodiment, the subsequent rotor position estimate and the rotor flux amplitude are used in the control of the electrical generator.

According one embodiment, a method for determining a rotor position of an electrical generator is provided, the method comprising determining a voltage of the electrical generator, determining a rotor position angle estimate based on the voltage of the electrical generator, and determining a subsequent rotor position angle estimate through a feedback loop, based on a combination of the voltage of the electrical generator and the rotor position angle estimate.

According to an embodiment, a computer readable medium having a computer program recorded thereon, the computer program including instructions which, when executed by a processor, make the processor perform a method for determining a rotor position of an electrical generator as described above is provided.

According to another embodiment, an apparatus for determining a rotor position of an electrical generator in a wind turbine according to the method described above is provided.

According to one embodiment, a method for reliable real time tracking of encoder health in a wind turbine generator is provided comprising inputting a voltage reference from a generator controller to a phase lock loop to obtain the angle of the voltage reference; computing the differentiation of the angle difference between the voltage reference angle and the calibrated rotor angle; sending, if the angle difference is more than a threshold, an encoder failure signal to a system supervision configured to take necessary action and start ramping down the turbine power.

BRIEF DESCRIPTION OF THE DRAWINGS

In the drawings, like reference characters generally refer to the same parts throughout the different views.

The drawings are not necessarily to scale, emphasis instead generally being placed upon illustrating the principles of the invention. In the following description, various embodiments of the invention are described with reference to the following drawings, in which.

DETAILED DESCRIPTION

Exemplary embodiments of the method for controlling an electrical generator in accordance with the present invention will be described in detail below with reference to the accompanying figures. It will be appreciated that the exemplary embodiments described below can be modified in various aspects without changing the essence of the invention. Furthermore, embodiments described in the context of the method for determining a rotor position of an electrical generator in a wind turbine are analogously valid for the apparatus and the computer readable medium.

Figure 1:
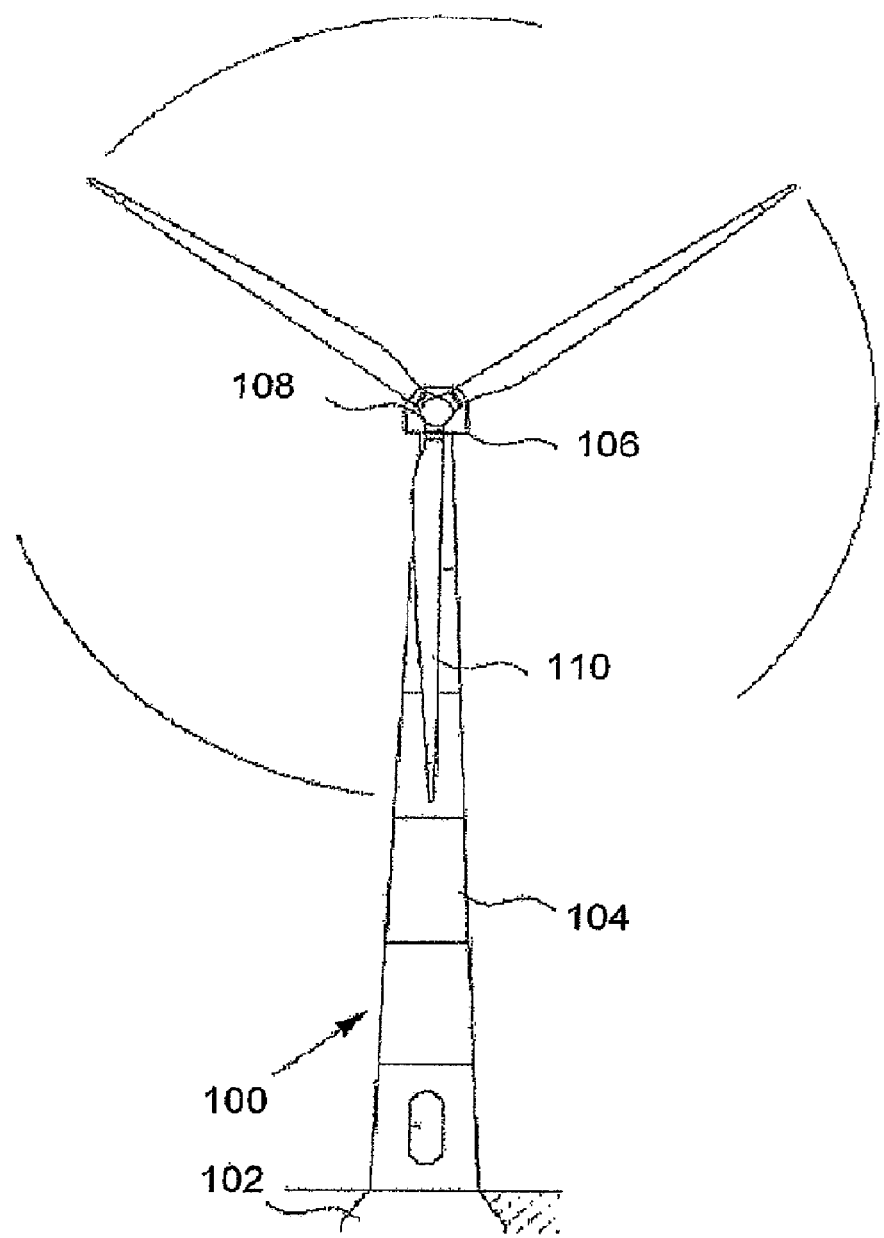
FIG. 1 illustrates a common setup of a conventional wind turbine.

FIG. 1 illustrates a common setup of a conventional wind turbine 100. The wind turbine 100 is mounted on a base 102. The wind turbine 100 includes a tower 104 having a number of towers sections, such as tower rings. A wind turbine nacelle 106 is placed on top of the tower 104. The wind turbine rotor includes a hub 108 and at least one rotor blade 110, e.g. three rotor blades 110. The rotor blades 110 are connected to the hub 108 which in turn is connected to the nacelle 106 through a low speed shaft which extends out of the front of the nacelle 106.

Figure 2:
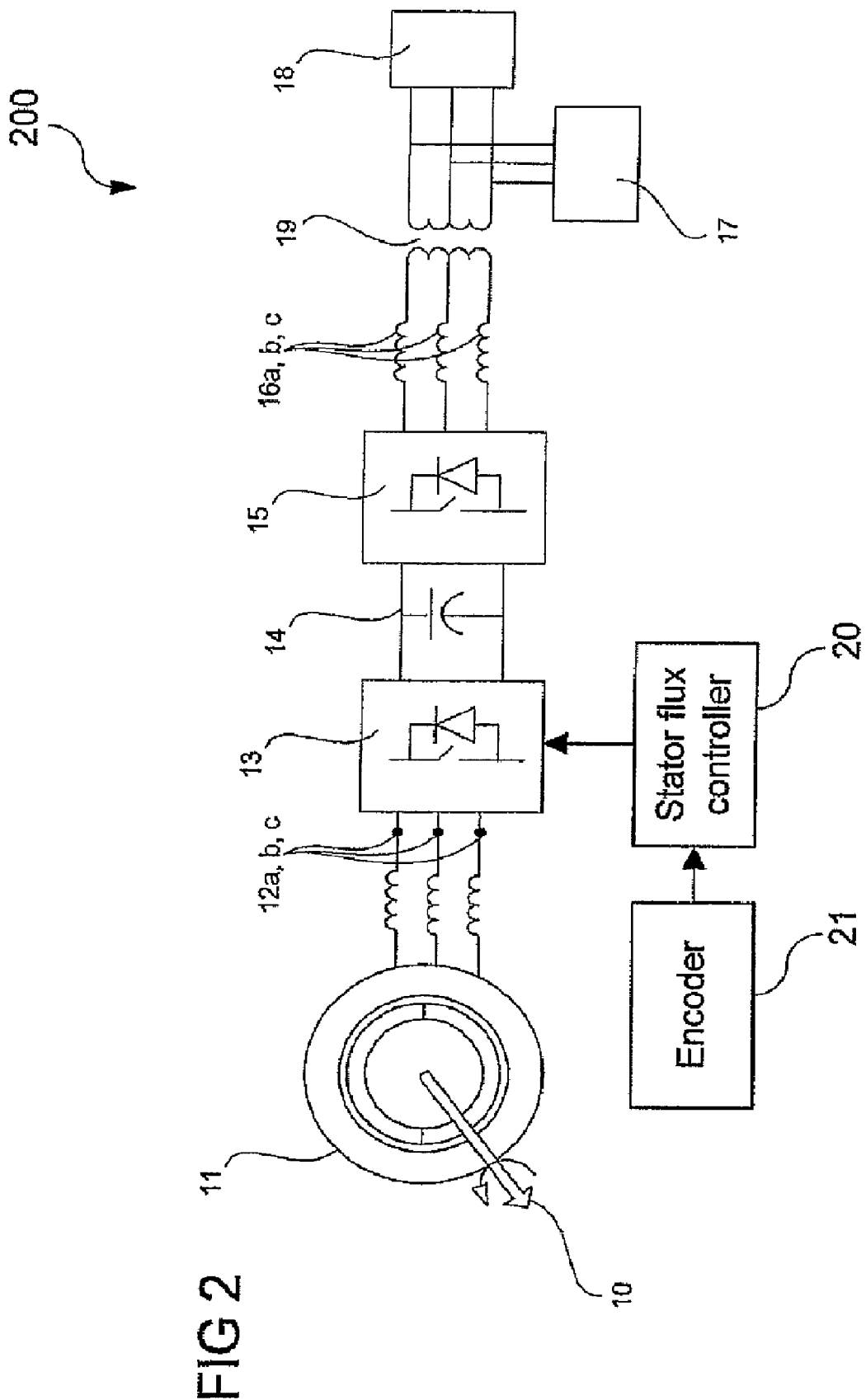
FIG. 2 illustrates an example of power generation system according to an embodiment of the present invention.

FIG. 2 illustrates an example of power generation system 200 according to an embodiment.

A shaft 10 transfers mechanical energy from an energy source, for example the at least one rotor blade 110 shown in FIG. 1, to a rotor of a variable speed generator 11. The shaft 10 is connected to the at least one rotor blade 11 and is for example connected to the rotor via a gearbox in order to adapt the rotational speed of the shaft 10 (i.e. the speed of the wind turbine blades) to a speed range suitable for the generator 11. The generator 11 converts the mechanical energy provided via the shaft 10 into electrical energy and delivers the electrical energy at a set of stator terminals 12a, 12b, 12c. The rotational speed of the shaft 10 varies as a function of the wind speed. Since the rotational speed of the rotor of the generator 11 is proportional to the rotational speed of the shaft 10, the amplitude and frequency of the voltage signal provided by the generator 11 at the stator terminals 12a, 12b, 12c varies in accordance with the rotational speed of the shaft 10. The generator may be a synchronous generator, e.g. a permanent magnet (PM) generator or any other type of generator comprising a stator winding. The terminals 12a, 12b, 12c of the generator 11 are connected to a generator side power converter 13. The converter 13 for example comprises a set of switches in the form of, for example, MOSFETs, GTOs, IGBTs or BJTs.

The converter 13 functions, under normal operation, as an active rectifier converting the variable frequency AC voltage provided by the generator 11 into a DC voltage. The conversion may be controlled using a pulse width modulation (PWM) scheme, wherein control signals are applied to the switches of the converter 13 in order to provide the desired conversion functionality. In one embodiment, the switches are controlled by employing a space vector modulation scheme.

The output of the converter 13 is provided to a DC link 14 which comprises a link capacitor for reducing the voltage ripple on the DC link.

The DC link 14 is connected to a grid side power converter 15. The topology of the grid side power converter 15 may be similar to the generator side power converter 13. The grid side power converter 15 for example normally operates as an inverter for converting the DC voltage on the DC link 14 into a regulated AC voltage for feeding active and reactive power to a power grid 18.

The output of the grid side power converter 15 may be filtered by means of inductors 16a, 16b, and 16c in order to, for example, remove high order harmonics from the output power signal. The output power signal is then provided to the power grid 18 via a transformer 19. The output power signal may, if needed, be filtered by a filter 17 in order to keep the interference or harmonic distortion at a low value.

Figure 3:
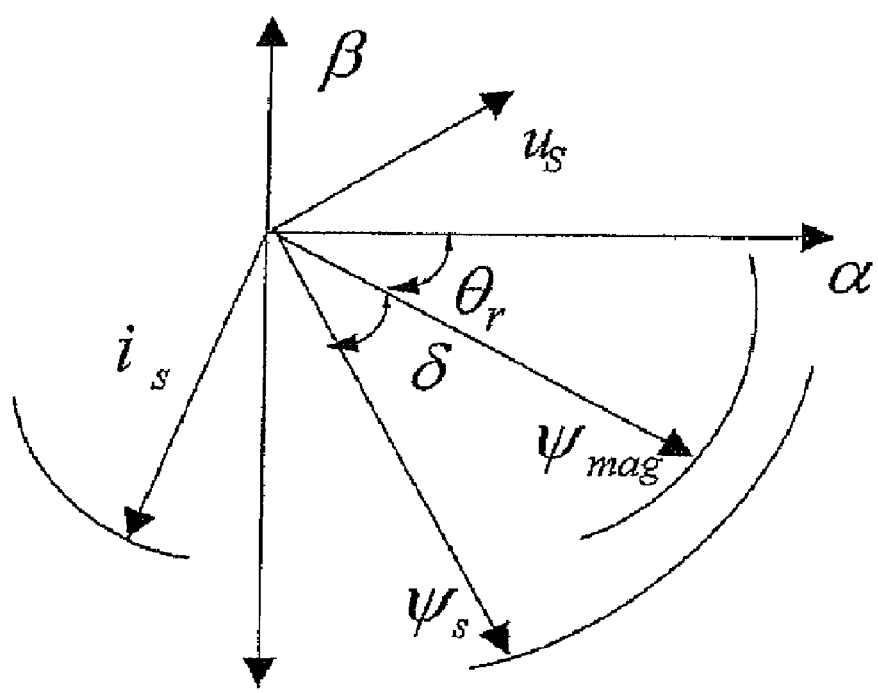
FIG. 3 illustrates a vector diagram for a synchronous electrical generator represented in a stationary reference frame.

FIG. 3 illustrates a vector diagram 300 for a synchronous electrical generator represented in a stationary reference frame.

The diagram comprises two stationary axes denoted α and β. The stationary reference frame is thus also referred to as αβ (reference) frame.

A transformation of a voltage from the three phase stationary coordinate system, which may also be referred to as the stationary three phase abc reference frame, to the αβ frame may be performed according to $$\begin{bmatrix} U_\alpha \\ U_\beta \end{bmatrix} = \begin{bmatrix} 2/3 & -1/3 & -1/3 \\ 0 & \sqrt{3}/3 & \sqrt{3}/3 \end{bmatrix} \cdot \begin{bmatrix} U_a \\ U_b \\ U_c \end{bmatrix}$$

wherein $U_a$, $U_b$, $U_c$ refer to the three phase voltages and $U_\alpha$, $U_\beta$ refer to the components of the voltage in the αβ frame.

From the αβ stationary coordinate system, i.e. the αβ frame, a transformation may be performed into a dq rotating coordinate system according to $$\begin{bmatrix} U_q \\ U_d \end{bmatrix} = \begin{bmatrix} -\sin\theta & \cos\theta \\ \cos\theta & \sin\theta \end{bmatrix} \cdot \begin{bmatrix} U_\alpha \\ U_\beta \end{bmatrix}$$

where $\theta=\omega t$ is the angle between the stationary α axis and the synchronous d axis, i.e. the axis synchronous with the rotor.

The voltages $U_\alpha$, $U_\beta$ may be normalized to $U_{\alpha\_nom}$, $U_{\beta\_nom}$ in accordance with $$\begin{bmatrix} U_{\alpha\_nom} \\ U_{\beta\_nom} \end{bmatrix} = \frac{1}{\sqrt{U_\alpha^2 + U_\beta^2}} \cdot \begin{bmatrix} U_\alpha \\ U_\beta \end{bmatrix}.$$

In FIG. 3, a first vector, denoted by $\Psi_{mag}$, represents the magnetizing flux.

In the example shown in FIG. 3, which refers to a synchronous generator, the magnetizing flux corresponds to the rotor flux $\Psi_r$. The rotor flux may be generated by means of a permanent magnet, as in a PM generator, by excitation of a field coil in the rotor (i.e. a wound generator). The arc at the tip of the rotor flux vector illustrates that the vector rotates about the origin of coordinates in FIG. 3. The angular displacement of the rotor flux vector from the α axis is denoted by $\theta_r$ in FIG. 3.

In a corresponding manner, the stator flux vector, denoted by $\Psi_s$ in FIG. 3, is a vector which rotates about the origin of coordinates.

In steady state operation the stator flux vector rotates in the stationary reference frame with an angular speed equal to the rotor flux vector. The angular displacement of the stator flux vector from the rotor flux vector is denoted by δ in FIG. 3.

The electromagnetic power $P_{EM}$ of a synchronous generator is proportional to $\omega\Psi_s\times\Psi_r$ where $\omega$ is the rotational speed of the rotor. This means that $$P_{EM}=f(|\Psi s|,|\Psi r|,\delta).$$

From this, it can be seen that for a given speed of operation (i.e. a given rotor rotation speed), the electromagnetic power depends on the magnitude of the stator flux vector and its location with respect to the rotor flux vector. If the position of the rotor flux vector is known, it is possible to apply a voltage to the stator that positions the stator flux vector to give the desired magnitude of the power at a given rotational speed. Hence, by controlling the stator flux vector, the electromagnetic power, which corresponds to the power given to the load, can be obtained as desired.

The stator flux vector may for example be controlled by a suitable control of the generator side power converter 13. Accordingly, in one embodiment, the power generation system 200 includes a stator flux controller 20 which controls the generator side power converter 13 such that the power supplied by the electrical generator 11 to the power grid 18 has a desired magnitude. The stator flux controller 20 needs, in one embodiment, information about the rotor position, e.g. a phase angle of the rotor, and/or information about the angular speed of the rotor. This information is for example supplied by an encoder 21 which for example generates the information about the rotor position and/or the angular speed based on measurements.

The information output by the encoder 21 may also be used for other functions than the stator flux control.

The encoder 21 may have an offset, e.g. the angular position determined by the encoder may differ from the actual angular position of the rotor by a certain offset. Therefore, in one embodiment, before any function for which a determination of the rotation speed and/or the position of the rotor is required can be started, which may include the start of power generation, i.e. actual power supply of the electrical generator 11 to the power grid 18, an offset encoder calibration is carried out, i.e. an encoder offset is determined by which the phase angle of the rotor output by the encoder is adjusted such that the adjusted phase angle is aligned with the actual phase angle of the rotor (e.g. a permanent magnet rotor).

Figure 4:
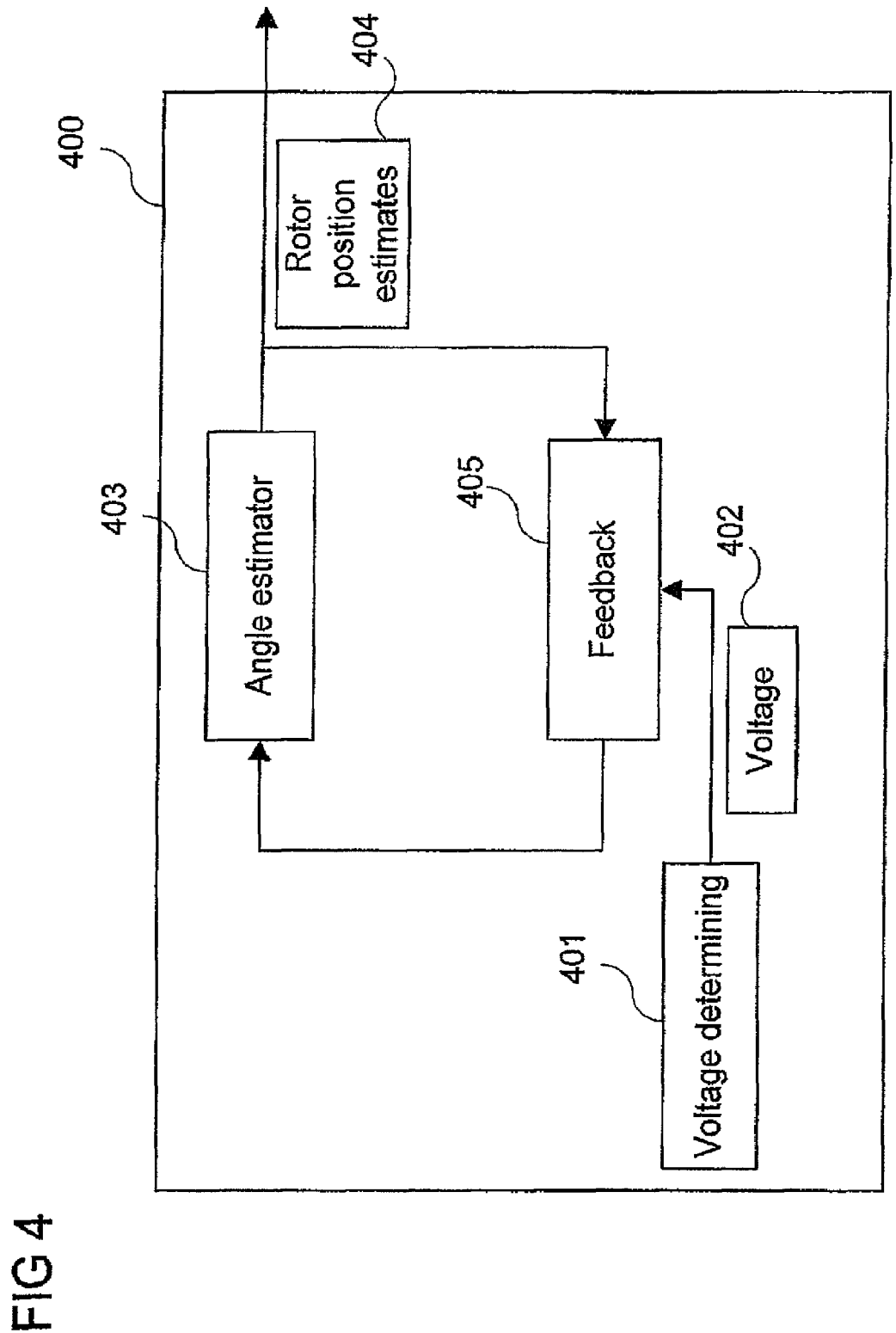
FIG. 4 shows a block diagram for determining a rotor position of an electrical generator according to an embodiment of the present invention.

According to one embodiment, a block diagram for determining a rotor position of an electrical generator is provided as illustrated in FIG. 4, which may, for example, be used for encoder offset calibration.

FIG. 4 shows a block diagram 400 for determining a rotor position of an electrical generator according to an embodiment.

The block diagram 400 may include a voltage determining block 401 configured to determine a voltage 402 of the electrical generator. Further, the block diagram 400 includes an angle estimating block 403 configured to determine a rotor position angle estimate 404 based on the voltage 402 of the electrical generator.

The block diagram 400 further includes a feedback block 405 configured to combine the rotor position angle estimate 404 with the voltage of the electrical generator. The angle estimating block 403 is configured to determine a subsequent rotor position angle estimate 404 based on the combination.

The block diagram 400 may for example be implemented by a processor which is programmed in accordance with the functionality of the block diagram 400 using software. The software may for example be executed by a processor in a power controller of the wind turbine. The block diagram 400 may also be implemented using a circuit. In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In other words, in one embodiment, a control loop is used for determining the rotor position angle based on the voltage vector (or the voltage vector angle). The estimate of the rotor position angle may be seen as the controlled variable in one embodiment and may be seen to be controlled such that it corresponds to the phase angle of the current voltage vector, i.e. has the value that it should theoretically have based on the phase angle of the current voltage vector, e.g. Pi/2 less than the phase angle of the current voltage vector. In one embodiment, the voltage angle is subtracted by pi/2 to obtain the rotor angle position because the voltage angle leads the rotor angle by pi/2.

In one embodiment, the combining includes a coordinate transformation of the voltage in accordance with the rotor position angle estimate, for example a coordinate transformation of the voltage to a coordinate system fixed with the rotor position as specified by the rotor position angle estimate.

According to one embodiment, the combining includes the determination of the difference between the phase of the voltage and a phase of the voltage to be expected when the rotor of the electrical generator has the rotor position according to the rotor position angle estimate.

The angle estimating block 403 may be configured to determine the rotor position angle estimate based on the phase of the voltage of the electrical generator.

In one embodiment, the voltage determining block 401 is configured to determine a voltage of the electrical generator at a first time instant and a voltage of the electrical generator at a second time instant, wherein the angle estimating block 403 is configured to determine the rotor position angle estimate based on the voltage of the electrical generator at the first time instant, wherein the feedback block 405 configured to combine the rotor position angle estimate with the voltage of the electrical generator at the second time instant; and wherein the angle estimating block 403 is configured to determine the subsequent rotor position angle estimate based on the combination.

According to one embodiment, the angle estimating block 403 and the feedback block 405 are configured according to a phase locked loop for rotor position angle determination.

In one embodiment, the angle estimating block 403 and the feedback block 405 form a control loop.

The angle estimating unit may for example include a PI controller.

In one embodiment, the combining includes the determination of the difference between the phase of the voltage and a phase of the voltage to be expected when the rotor of the electrical generator has the rotor position according to the rotor position angle estimate and the PI controller receives the difference as input.

For example, the PI controller is configured to determine an angular speed of the voltage determined by the voltage determining block 401.

The angle estimator block 403 may include an integrator configured to integrate the angular speed of the voltage for rotor position estimation.

In one embodiment, the feedback block 405 is configured to determine a mapping function which adjusts the rotor position estimation speed and the angle estimating block 403 is configured to determine the subsequent rotor position estimate based on the output of the mapping function.

In one embodiment, the voltage is a stator voltage of the electrical generator.

In one embodiment, the voltage determining block 401 is configured to determine the voltage from a line-to-line voltage of the electrical generator.

For example, the voltage determining block 401 is configured to determine the phase voltages of the electrical generator (e.g. the three phase voltages when the electrical generator is a generator with three phases) from the line-to-line voltage and to determine the voltage from the phase voltages.

According to one embodiment, a power generation system is provided comprising the block as described above. The power generation system may further comprise an encoder for a rotor position determination of the electrical generator and may further comprise an encoder offset calibration block determining an offset of the encoder based on the second rotor position angle estimate. For example, the encoder offset calibration block is configured to calibrate the offset of the encoder.

The power generation system may also comprise an encoder for a rotor position determination of the electrical generator and further comprise a detection block configured to detect a malfunction of the encoder based on the second rotor position angle estimate. For example, the rotor position estimation may be used for real time tracking the functionality of the encoder.

The electrical generator is for example a wind turbine generator.

The block diagram 400 described above with reference to FIG. 4 may further include encoder offset calculation and may be realized using a PLL. This is described in the following with reference to FIG. 9.

Figure 9:
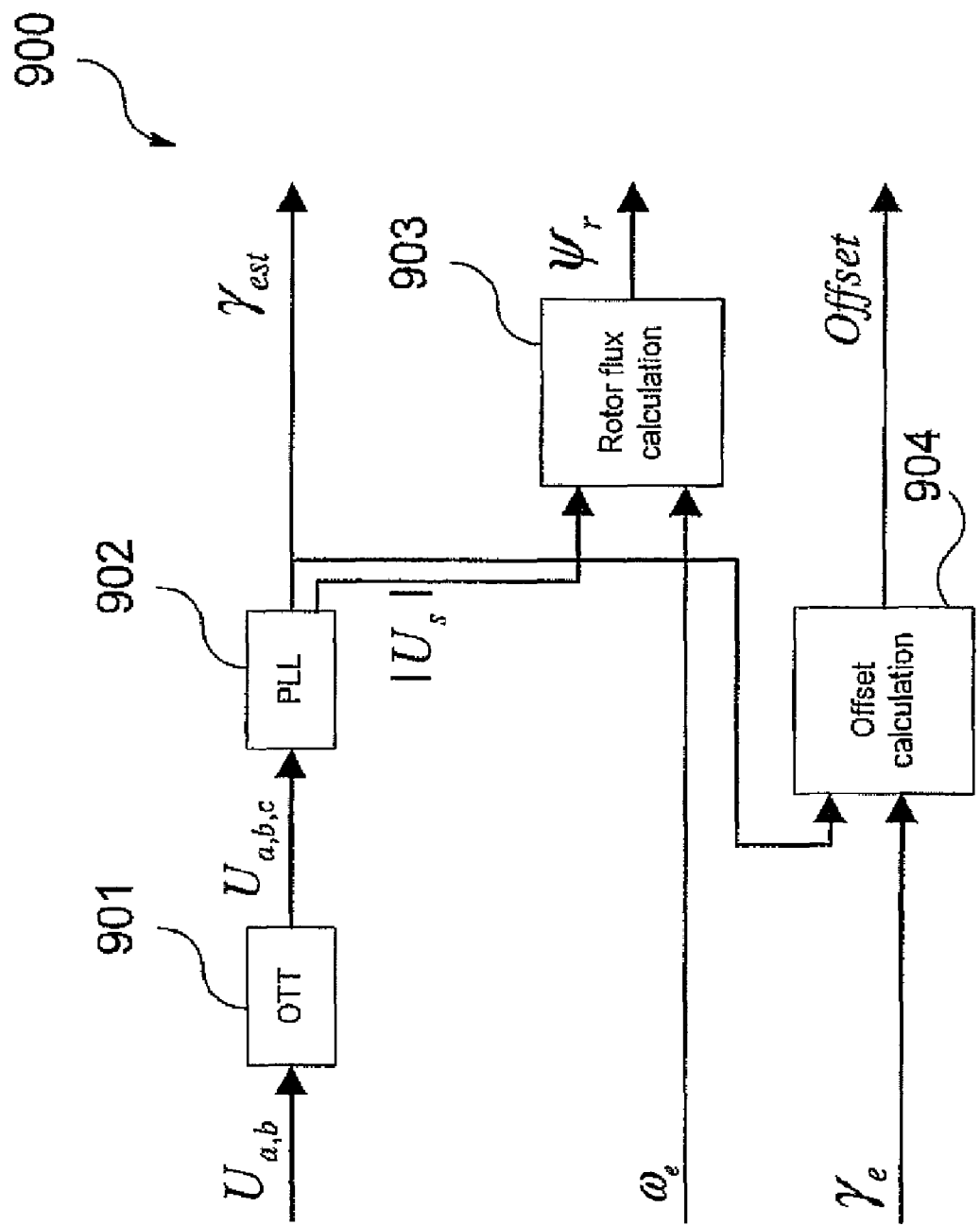
FIG. 9 shows a block diagram according to an embodiment.

FIG. 9 shows a block diagram 900 according to an embodiment.

The block diagram 900 includes an OTT block 901 which receives a phase-to-phase voltage $U_{ab}$ as input and generates three phase voltages $U_{abc}$. The phase voltages $U_{abc}$ are fed to a PLL 902 which generates an estimated voltage phase angle $\gamma_{est}$. The PLL 902 further outputs an amplitude of a voltage vector $|U_s|$ which is fed to a rotor flux calculation block 903 which also receives an angular speed $\omega_e$ as input and generates a rotor flux amplitude $\psi_r$.

The estimated voltage phase angle $\gamma_{est}$ and an angular rotor position as output by the encoder $\gamma_e$ are fed to an offset calculation block 904 which determines the encoder offset.

The block diagram 900 described above with reference to FIG. 9 will be described later in more details with reference to FIG. 6.

Figure 5:
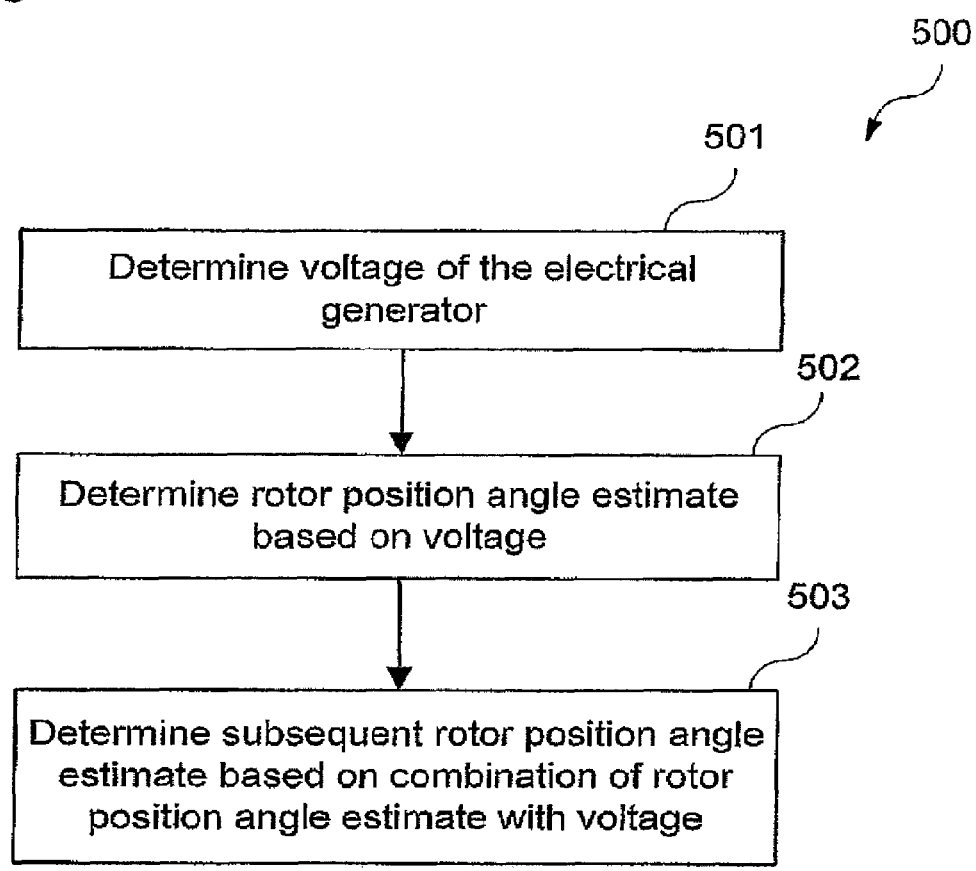
FIG. 5 shows a flow diagram according to an embodiment of the present invention.

The block diagram 400 for example carries out a method for determining a rotor position of an electrical generator as illustrated in FIG. 5.

FIG. 5 shows a flow diagram according to an embodiment.

In 501, a voltage of the electrical generator is determined.

In 502, a rotor position angle estimate is determined based on the voltage of the electrical generator.

In 503, a subsequent rotor position angle estimate is determined based on a combination of the rotor position angle estimate with the voltage of the electrical generator.

The method may for example be carried out by an apparatus which is suitably configured. In one embodiment, the method is carried out by a processor which is programmed to carry out the method.

According to one embodiment, the method may comprise
1. Determine the three phase stator voltages of the generator;
2. Determine the voltage angle;
3. Determine the rotor position based on voltage angle;
4. Calibrate encoder based on estimated rotor position from step 3 and encoder position output.

According to one embodiment, a robust and accurate solution for encoder position offset calibration and rotor flux magnitude computation is provided. According to another embodiment, a real time tracking of encoder health for reliable operation is provided.

Embodiments may for example be applied to a permanent magnet (PM) generator of a wind turbine generator. As explained above, encoder calibration may typically be a prerequired step before any generator control task can proceed for a PM machine. In a PM machine, the encoder calibration may for example include the process to align the position reading from the encoder with the location of the north pole of the permanent magnet of the electrical generator. Further, since an encoder of a wind turbine generator is prone to failure, a real time tracking of encoder health may be required for reliable operation. In one embodiment, encoder health (e.g. whether the encoder functions correctly or functions within a pre-defined accuracy range) is tracked in real time in normal operation and an alarm is sent in case of encoder failure or malfunction.

An example for a block for encoder offset calibration according to one embodiment which includes a block for determining a rotor position of an electrical generator is explained in the following with reference to FIG. 6.

Figure 6:
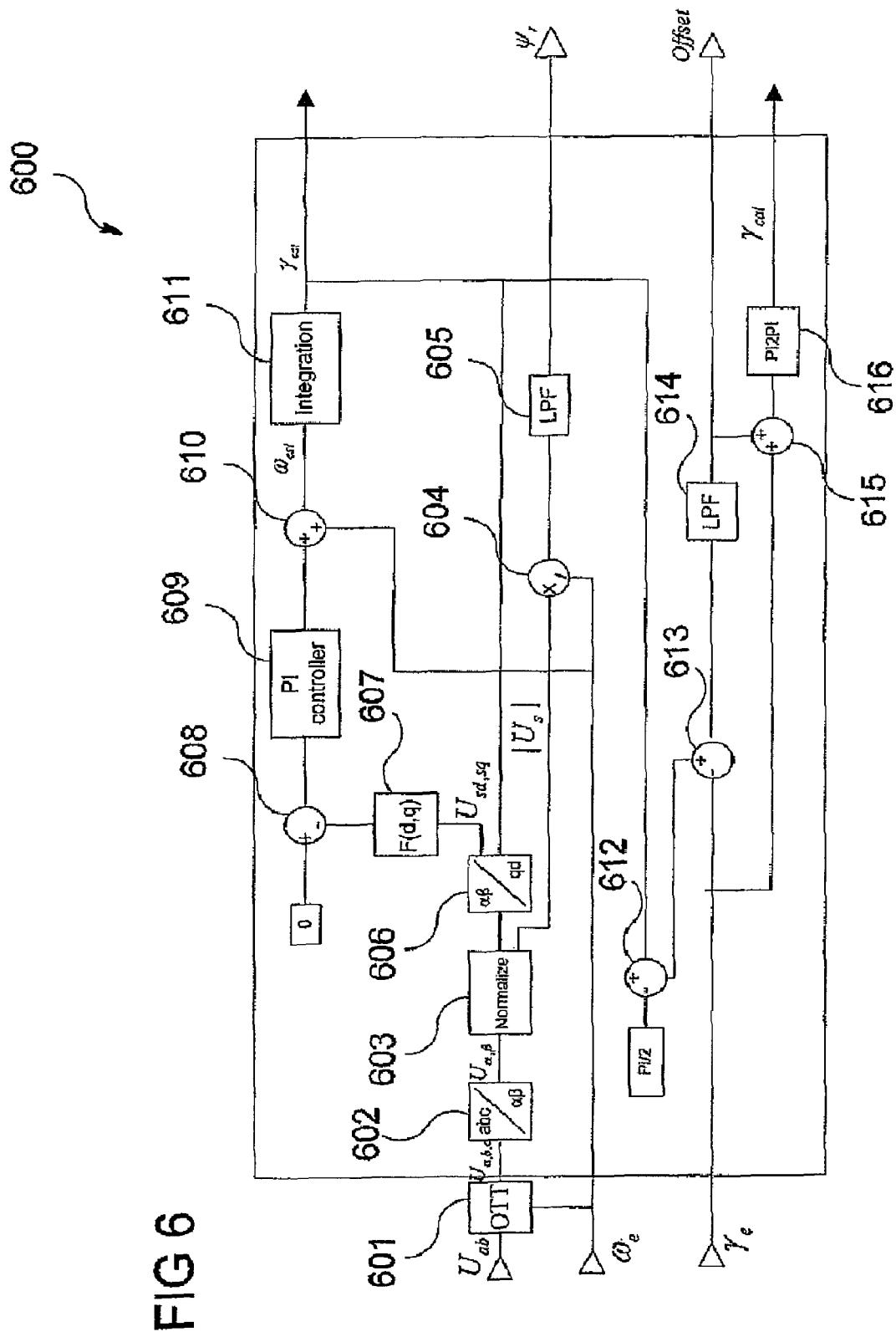
FIG. 6 shows a block diagram for encoder offset calibration according to an embodiment of the present invention.

FIG. 6 shows a block diagram 600 for encoder offset calibration according to an embodiment.

The method carried out by the apparatus 600 serves for encoder offset calibration and rotor flux calculation. By this method the encoder offset is determined, so that by adjusting the encoder output with this offset, the rotor postion is obtained.

As one input, the block diagram 600 receives a stator phase-to-phase voltage $U_{ab}$ of the electrical generator. The phase-to-phase voltage is fed to an OTT (One-To-Three technology) block 601 which contracts the three phase voltages $U_a$, $U_b$, $U_c$ from the single line voltage $U_{ab}$ by using One-To-Three technology (OTT). In another embodiment, the three phase stator voltages $U_a$, $U_b$, $U_c$ may also be determined by measurement of the three phase stator voltages.

The three phase voltages $U_a$, $U_b$, $U_c$ are fed to a phase lock loop control block. By this phase lock loop, the phase angle of three phase voltage is obtained.

For this, the three phase voltages $U_a$, $U_b$, $U_c$ are transformed to the $\alpha\beta$ frame, i.e. to the stator $\alpha$-axis component $U_\alpha$ and the stator $\beta$-axis component $U_\beta$ in $\alpha\beta$ frame by an abc/$\alpha\beta$ transforming block 602.

A normalization block 603 normalizes the stator $\alpha$-axis component $U_\alpha$ and the stator $\beta$-axis component $U_\beta$, e.g. in accordance to $$\begin{bmatrix} U_{\alpha\_nom} \\ U_{\beta\_nom} \end{bmatrix} = \frac{1}{\sqrt{U_\alpha^2 + U_\beta^2}} \cdot \begin{bmatrix} U_\alpha \\ U_\beta \end{bmatrix},$$

i.e. by calculating the amplitude of voltage vector as $$|U_s| = \sqrt{(U_\alpha)^2 + (U_\beta)^2}.$$

The normalization process may be used to eliminate the effect of voltage amplitude in the phase lock loop control.

For determining the rotor flux amplitude, the amplitude of voltage vector $|U_s|$ is fed to a divider which divides the amplitude of voltage vector $|U_s|$ by the angular speed $\omega_e$ output by the encoder. The result of the division is output, possibly after filtering by a first low pass filter (LPF) 605, as the rotor flux amplitude $\psi_r$. In other words, the rotor flux amplitude $\psi_r$ is computed as $\psi_r = |U_s|/\omega_e$. The determined rotor flux may for example be used for rotor flux calibration. As indicated above, the rotor position and the rotor flux amplitude may be used in the control of the electrical generator.

An $\alpha\beta$/qd transforming block 606 transforms the normalized stator $\alpha$-axis component $U_\alpha$ and the normalized stator $\beta$-axis component $U_\beta$ to the dq frame using the current estimate for the voltage vector phase angle $\gamma_{est}$, e.g. in accordance with $$\begin{bmatrix} U_{sq} \\ U_{sd} \end{bmatrix} = \begin{bmatrix} \cos\gamma_{est} & \sin\gamma_{est} \\ \sin\gamma_{est} & -\cos\gamma_{est} \end{bmatrix} \cdot \begin{bmatrix} U_\alpha \\ U_\beta \end{bmatrix}.$$

where $U_{sd}$ is the stator voltage d-axis component in d/q frame and $U_{sq}$ is the stator voltage q-axis component in dq frame.

The $\alpha\beta$/qd transforming may be seen as transforming the voltage in $\alpha/\beta$ frame to dq frame using the feedback signal, i.e. the currently estimated voltage angle.

The stator voltage d-axis component in d/q frame $U_{sd}$ and the stator voltage q-axis component in d/q frame $U_{sq}$ are fed to a mapping block 607 which maps these components to a function value of a function F which may be seen as function of the phase error $\Delta\theta$ between the actual voltage phase angle (i.e. the phase angle of the current stator voltage as represented by $U_{sd}$ and $U_{sq}$) and the estimated voltage vector phase angle (i.e. the fed back estimate for the stator voltage phase angle $\gamma_{est}$) to $$F(\Delta\theta) = \tan(\Delta\theta) = Usd/Usq, \ |\Delta\theta| < \Delta\theta_m$$

$$F(\Delta\theta) = -F_{Lim}, \ -\pi < \Delta\theta < -\Delta\theta_m$$

$$F(\Delta\theta)=F_{Lim}, \Delta\theta_m<\Delta\theta<\pi$$

where $\Delta\theta_m$ is a pre-defined threshold value.

The phase error $\Delta\theta$ is for example determined according to $\tan(\Delta\theta)=U_{sd}/U_{sq}$.

Mapping block 607 can be described as an adjustable gain function F(d,q), which is used to adjust the tracking speed according to the tuning phase error. The function F is illustrated in FIG. 7.

Figure 7:
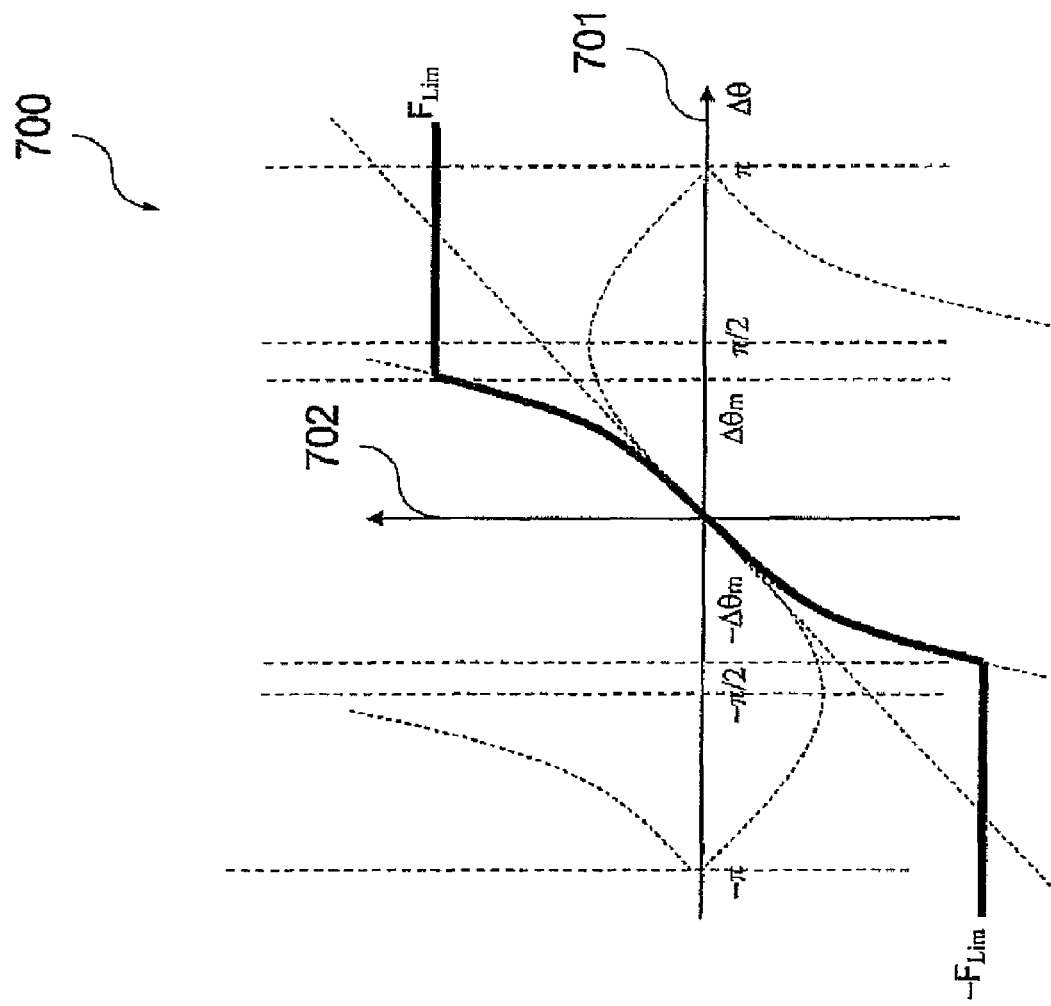
FIG. 7 shows a graph shows the output of a function F(d,q) versus the phase error (i.e., the graph the function F(d,q)) according to one embodiment.

FIG. 7 shows a graph shows the output of a function F(d,q) versus the phase error (i.e. the graph the function F(d,q)) according to one embodiment.

A first axis 701 (x-axis) of the graph 700 corresponds to the possible values of the phase error $\Delta\theta$ and a second axis 702 (y-axis) of the graph 700 corresponds to the function values of F.

The output of the mapping block 607 is compared to zero (which may be seen as the should-be value of the phase error $\Delta\theta$) by a first comparing block 608. The difference between the phase error $\Delta\theta$ and zero is input to a PI controller 609 with output limiting. The output of the PI controller is the angular speed of the voltage vector (as represented by $U_{sd}$ and $U_{sq}$) in the dq frame.

From a signal processing point of view, the PI controller 609 may be seen to function as a low pass filter that filters the voltage noise such that a high angle estimation accuracy may be achieved.

A first adder 610 adds the angular speed $\omega_e$ from encoder output and output from PI controller to generate the estimated angular speed $\omega_{est}$ of the voltage vector in $\alpha\beta$ frame.

An integrator 611 generates the estimated phase angle of the voltage vector $\gamma_{est}$ by integration of the angular speed in $\alpha\beta$ frame.

In one embodiment, since the stator voltage phase (tracking) error can be in range of $-\pi$ to $\pi$, the function F provides a faster tracking mechanism in this range. When the angle difference is within $-\Delta\theta_m$ and $\Delta\theta_m$, a tangent (tan) function may be used and when the absolute value of the phase angle error is larger than $\Delta\theta_m$, the output of the mapping block 607 is clamped at max limit. Therefore, the output of the PI controller (the angular speed) will be adjusted according to the angle difference to eliminate the phase tracking error.

A first subtracter 612 subtracts $\pi/2$ from $\gamma_{est}$ to generate the PM rotor phase angle corresponding to the estimated voltage phase angle $\gamma_{est}$. A second comparing block 613 compares the PM rotor phase angle output by the first subtracter 612 with the angular rotor position as output by the encoder $\gamma_e$. The output of the second comparing block 613 is, possibly filtered by a second low pass filter 614, output as the encoder offset. The encoder offset may be output and may be used to calibrate the encoder. The calibration may be done by adding the determined offset to the angular rotor position as output by the encoder $\gamma_e$ by a second adder 615 and transforming the result to an angle within $-\pi$ and $\pi$ by a transforming block 616 to generate a calibrated angular position $\gamma_{cal}$.

As explained above, the encoder calibration may be necessary to be carried out before normal operation mode, i.e. before power is actually supplied from the electrical generator 11 to the power grid 18.

In normal operation mode (in other words, during power generation, i.e. supply of power to the power grid), a similar method as described in 600 may be used for the real time tracking of encoder health.

Figure 8:
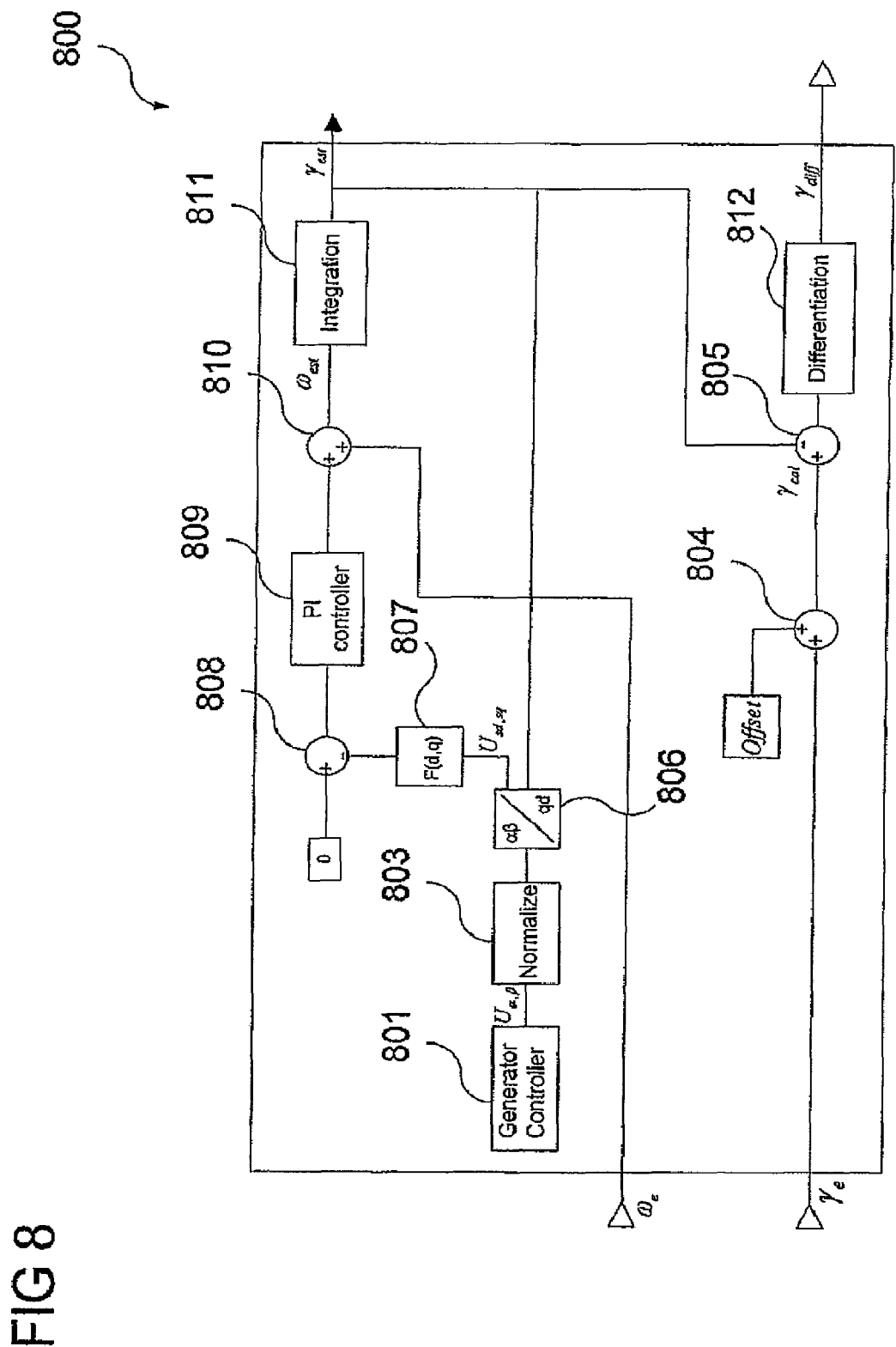
FIG. 8 shows a block diagram for real time tracking of encoder health according to an embodiment of the present invention.

FIG. 8 shows a block diagram 800 for real time tracking of encoder health according to an embodiment.

The block diagram 800 may be seen as being identical to block diagram 600 shown in FIG. 6 except for a minor modification. The block diagram 800 includes a generator controller 801 which outputs a reference voltage in $\alpha/\beta$ frane—$U_\alpha$ and $U_\beta$. The block diagram 800 further includes, analogously to the block diagram 600, a normalization block 803, an $\alpha\beta$/qd transforming block 806, a mapping block 807, a first comparing block 808, a PI controller 809, a first adder 810, and an integrator 811 which serve to calculate an estimate of the phase angle $\gamma_{est}$ of the voltage input by the generator controller 801 as it has been explained above in the context of FIG. 6.

A second adder 804 of the block diagram 800 adds the encoded offset determined previously, e.g. by the block diagram 600 before power generation mode has been started, to the angular rotor position as output by the encoder to generate the calibrated angular position $\gamma_{cal}$.

During power generation, in one embodiment, a control system of the power generation system ensures that $U_\alpha$ and $U_\beta$ change smoothly.

Therefore, the difference between the calibrated encoder angular position $\gamma_{cal}$ and the estimated angular position of the reference voltage $\gamma_{est}$ also changes smoothly. This difference is calculated by a subtracter 805 and the result is differentiated by a differentiator 812. The result of the differentiation $\gamma_{diff}$ of the ($\gamma_{cal}-\gamma_{est}$) signal may be expected to be close to a constant in generation operation dynamic and close to zero at steady state. However, an encoder failure or malfunction may be expected to cause $\gamma_{diff}$ to become very large. Thus, according to one embodiment, by continuously monitoring the $\gamma_{diff}$ signal, encoder failure or encoder malfunction may be detected.

According to one embodiment, a method and a system for encoder calibration is provided that is less sensitive to measurement noise and motor speed variation and allows calibrating an encoder with high accuracy. According to one embodiment, only one voltage sensor is required for calibration, e.g. one voltage sensor for measuring one line-to-line stator voltage.

Further, fast calibration convergence and short calibration time at all operation speed levels may be achieved. Additionally, embodiments allow real time tracking of encoder health for reliable operation.

According to an embodiment, a method for determining a rotor position of an electrical generator is provided. This method includes the following sub method:

1) Determine 3 phase voltage based on one phase-to-phase voltage. (OTT)
2) A method to track the phase angle of 3 phase voltage (PLL)
   a. PI controller is used
   b. An integration is used to obtain the angle from angular speed
   c. An adjustable gain function F(d,q) is used to adjust the tracking speed according to the tuning phase error.
   d. The estimated voltage angle is the feedback signal in PLL control
   e. A dq transformation is used
   f. A $\alpha/\beta$ transformation is used
3) Calculate the encoder offset based on output from 2) and encoder position output
4) The rotor position is obtained by using encoder position output and the offset obtained from above.
5) Calculate the rotor flux based on output from 2) and encoder angular speed output According to an embodiment, a method for real time encoder health tracking is provided. This method includes the following sub function;

1) Determine the phase angle of the reference voltage from generator controller using PLL
2) Compare this with the calibrated rotor phase angle.
3) By a differentiation process, the encoder health is monitored real time.

According to an embodiment, a method for determining a rotor position of a synchronous electrical generator in a wind turbine is provided comprising determining voltage of the electrical generator; determining a rotor position angle estimate based on the back Emf (electromotive force) voltage of the electrical generator; obtaining a rotor position angle determination from an encoder arranged on the electrical generator; combining the rotor position angle estimate and the rotor position angle from encoder output to obtain an offset value of the encoder the offset value being used to determine a calibrated rotor position; wherein the rotor position angle estimate is determined by passing the voltage of the electrical generator through a Phase lock loop control method.

In one embodiment, the voltage is a phase-to-phase voltage and the method further comprises converting the phase-to-phase voltage to three phase voltages of the electrical generator.

In one embodiment, a phase lock loop (PLL) is used to obtain the voltage phase angle from the three phase voltages. In one embodiment, when a phase lock loop is used, the voltage vector amplitude is obtained. By dividing the vector amplitude by the rotor speed, the rotor flux is obtained.

In one embodiment, the offset is obtained by subtracting the voltage phase angle by pi/2. The encoder offset is for example obtained by combining this rotor angle with the rotor angle from the encoder.

In one embodiment, the the rotor flux amplitude Ψr is obtained as a by-process.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus for determining a rotor position of an electrical generator in a wind turbine, the apparatus comprising:
    an encoder coupled with the electrical generator, the encoder configured to measure an angular position or an angular speed of a rotor of the electrical generator;
    a processor; and
    program code configured upon execution by the processor to determine a voltage of the electrical generator, determine a rotor position angle estimate based on the voltage of the electrical generator, determine a subsequent rotor position angle estimate through a feedback loop and based on a combination of the voltage of the electrical generator and the rotor position angle estimate, obtain an encoder output from the encoder, and compare the encoder output with the subsequent rotor position angle estimate,
    wherein the subsequent rotor position angle estimate is determined based on an adjustable gain function which adjusts a rotor position estimation speed.

2. The apparatus according to claim 1, wherein the voltage is a stator voltage of the electrical generator.

3. The apparatus according to claim 2, wherein the apparatus is configured to determine the voltage from a line-to-line voltage of the electrical generator.

4. The apparatus according to claim 3, wherein the apparatus is configured to determine the phase voltages of the electrical generator from the line-to-line voltage and to determine the voltage from the phase voltages.

5. The apparatus according to claim 1, wherein the subsequent rotor position angle estimate is used in the control of the electrical generator.

6. A power generation system comprising the apparatus according to claim 1.

7. The power generation system according to claim 6 wherein the apparatus is configured to determine an offset of the encoder based on the subsequent rotor position angle estimate.

8. The power generation system according to claim 7, wherein the apparatus is configured to calibrate the encoder based on the offset.

9. The power generation system according to claim 6 wherein the apparatus is configured to detect a malfunction of the encoder based on the subsequent rotor position angle estimate.

10. The power generation system according to claim 6, wherein the apparatus is configured to determine a rotor flux amplitude of the electrical generator based on the voltage and the encoder output.

11. The power generation system according to claim 10, wherein the encoder output is an angular speed measurement of the electrical generator.

12. The power generation system according to claim 10, wherein the subsequent rotor position angle estimate and the rotor flux amplitude are used in the control of the electrical generator.

13. A computer readable medium having a computer program recorded thereon, the computer program comprising instructions which, when executed by a processor, make the processor perform a method for determining a rotor position of an electrical generator in a wind turbine, the instructions comprising:
    determining a voltage of the electrical generator;
    determining a rotor position angle estimate based on the voltage of the electrical generator;
    determining a subsequent rotor position angle estimate through a feedback loop and based on a combination of the voltage of the electrical generator and the rotor position angle estimate;
    obtaining an encoder output from an encoder configured to measure an angular position or an angular speed of a rotor of the electrical generator; and
    comparing the encoder output with the subsequent rotor position angle estimate,
    wherein the subsequent rotor position angle estimate is determined based on an adjustable gain function which adjusts the rotor position estimation speed.

* * * * *

UNITED STATES PATENT AND TRADEMARK OFFICE
CERTIFICATE OF CORRECTION

| | | |
|---|---|---|
| PATENT NO. | : 8,089,172 B2 | Page 1 of 1 |
| APPLICATION NO. | : 13/008202 | |
| DATED | : January 3, 2012 | |
| INVENTOR(S) | : Li et al. | |

It is certified that error appears in the above-identified patent and that said Letters Patent is hereby corrected as shown below:

In the Specification:

At column 3, line number 36, before "one", insert --to--.

At column 4, line number 19, change the second occurrence of "shows" to --illustrating--.

At column 7, line number 47, change "Pi" to --pi--.

At column 8, line number 4, after "405", insert --is--.

At column 10, line number 10, change "angle of three phase voltage is" to --angles of the three phase voltages are--.

At column 11, line number 10, change the second occurrence of "shows" to --illustrating-- and at line number 10, after "graph", insert --of--.

At column 12, line number 2, change "frane" to --frame-- and at line number 33, change "is provided that is less sensitive to measurement noise and motor speed variation and allows" to --are provided that are less sensitive to measurement noise and motor speed variation and allow-- and at line 67, change ";" to --:--.

At column 13, line number 15, after "encoder", insert --,-- and at line number 32, after "the", delete "the".

Signed and Sealed this
Sixth Day of March, 2012

David J. Kappos
*Director of the United States Patent and Trademark Office*